US012561381B2

(12) United States Patent
Gupta et al.

(10) Patent No.: US 12,561,381 B2
(45) Date of Patent: Feb. 24, 2026

(54) TIME AND CLICK BASED UPDATABLE STATIC WEB PAGE RANKING

(71) Applicant: Microsoft Technology Licensing, LLC, Redmond, WA (US)

(72) Inventors: Saksham Gupta, Bellevue, WA (US); Maxim Sigalov, Seattle, WA (US); Aliaksei Bondarionok, Redmond, WA (US); Artashes Ter-Vardanyan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/244,341

(22) Filed: Sep. 11, 2023

(65) Prior Publication Data

US 2025/0086239 A1     Mar. 13, 2025

(51) Int. Cl.
*G06F 16/951* (2019.01)
*G06F 16/2457* (2019.01)
(Continued)

(52) U.S. Cl.
CPC ...... *G06F 16/951* (2019.01); *G06F 16/24578* (2019.01); *G06F 16/9535* (2019.01); *G06F 16/9538* (2019.01)

(58) Field of Classification Search
CPC ............. G06F 16/951; G06F 16/24578; G06F 16/9535; G06F 16/953; G06F 16/9532; G06F 16/9536; G06F 16/9538; G06F 16/285; G06F 16/335; G06F 16/353; G06F 16/9566; G06F 40/30; G06F 16/2477; G06F 16/35; G06F 2216/03; G06F 16/2453; G06F 16/24575; G06F 16/248; G06F 16/254; G06F 16/907; G06F 16/93; G06F 40/106; G06F 8/77; G06N 20/00; G06N 3/045; G06N 3/0464; G06N 3/09; G06N 3/0455; G06N 3/08; G06N 3/084; G06N 3/086; G06N 3/0895; G06N 3/0985; G06N 3/043;
(Continued)

(56) References Cited

U.S. PATENT DOCUMENTS

| | | | |
|---|---|---|---|
| 2014/0105488 A1* | 4/2014 | Geng .................. | G06F 18/2193 |
| | | | 382/161 |
| 2018/0300412 A1* | 10/2018 | Devries ................. | G06F 16/958 |

(Continued)

*Primary Examiner* — Marcin R Filipczyk
(74) *Attorney, Agent, or Firm* — Cantor Colburn LLP; Anand Gupta

(57) ABSTRACT

Aspects of the disclosure include methods and systems for a time and click based updatable static web page ranking. An exemplary method includes identifying a web page at a discovery time, predicting, by a first ranking model, a first ranking of the web page using first features available at the discovery time, and predicting, by a second ranking model, a second ranking of the web page using the first features. An index score is generated from the first ranking and the second ranking. The method includes, after discovery time, predicting, by the first ranking model, an updated first ranking of the web page using the first features, predicting, by the second ranking model, an updated second ranking of the web page using the first features and second features not available at the discovery time, and updating the index score from a combination of the updated first ranking and the updated second ranking.

19 Claims, 7 Drawing Sheets

(51) Int. Cl.
*G06F 16/9535* (2019.01)
*G06F 16/9538* (2019.01)

(58) Field of Classification Search
CPC ...... G06N 3/047; G06N 3/0475; G06N 3/092;
G06N 5/01; G06N 5/02; G06N 5/022;
G06N 5/045
See application file for complete search history.

(56) References Cited

U.S. PATENT DOCUMENTS

| | | | |
|---|---|---|---|
| 2019/0222602 A1* | 7/2019 | Linder | G06F 16/24578 |
| 2019/0347358 A1* | 11/2019 | Mishra | G06F 3/167 |
| 2020/0110754 A1* | 4/2020 | Lamburt | G06F 16/24578 |
| 2021/0365503 A1* | 11/2021 | Zhang | G06F 16/951 |
| 2022/0277015 A1* | 9/2022 | Zhang | G06N 3/045 |
| 2022/0300519 A1* | 9/2022 | Oonishi | G06F 16/248 |

* cited by examiner

Figure 1:
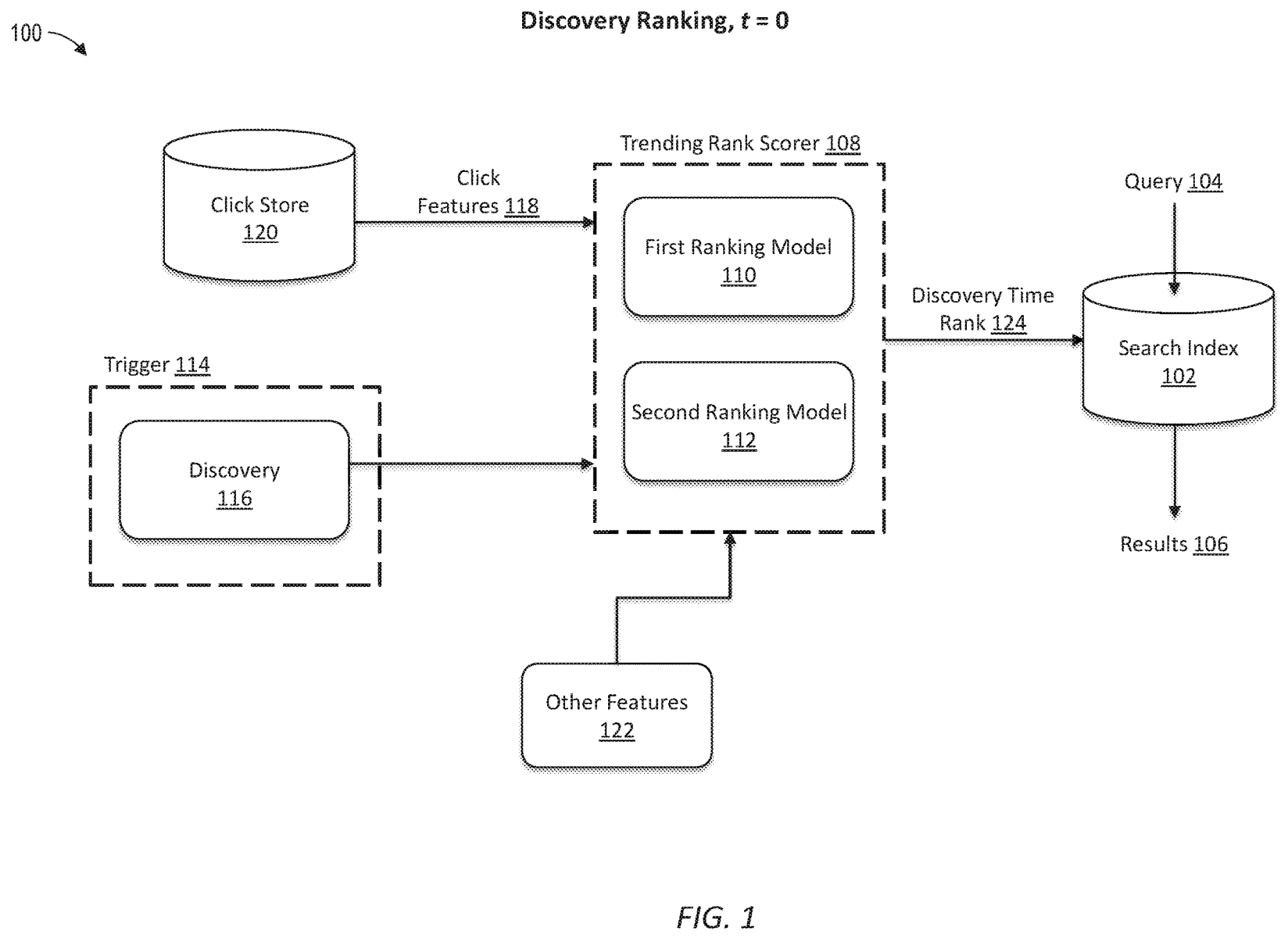

Discovery Ranking, $t = 0$

Query 104

Search Index 102

Results 106

Discovery Time Rank 124

Trending Rank Scorer 108

First Ranking Model 110

Second Ranking Model 112

Other Features 122

Click Features 118

Click Store 120

Trigger 114

Discovery 116

Re-Indexing Post-Discovery

700

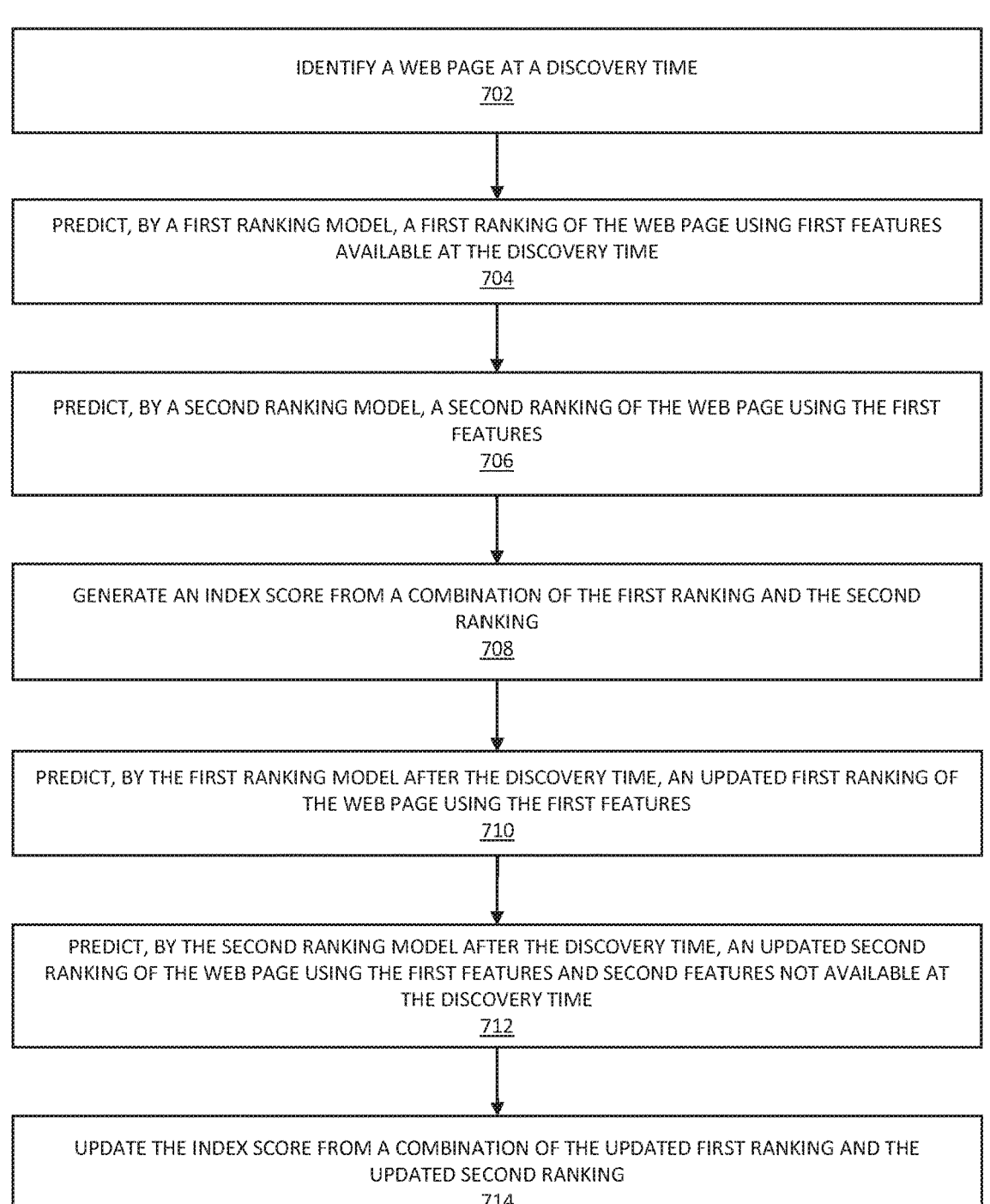

IDENTIFY A WEB PAGE AT A DISCOVERY TIME
702

PREDICT, BY A FIRST RANKING MODEL, A FIRST RANKING OF THE WEB PAGE USING FIRST FEATURES AVAILABLE AT THE DISCOVERY TIME
704

PREDICT, BY A SECOND RANKING MODEL, A SECOND RANKING OF THE WEB PAGE USING THE FIRST FEATURES
706

GENERATE AN INDEX SCORE FROM A COMBINATION OF THE FIRST RANKING AND THE SECOND RANKING
708

PREDICT, BY THE FIRST RANKING MODEL AFTER THE DISCOVERY TIME, AN UPDATED FIRST RANKING OF THE WEB PAGE USING THE FIRST FEATURES
710

PREDICT, BY THE SECOND RANKING MODEL AFTER THE DISCOVERY TIME, AN UPDATED SECOND RANKING OF THE WEB PAGE USING THE FIRST FEATURES AND SECOND FEATURES NOT AVAILABLE AT THE DISCOVERY TIME
712

UPDATE THE INDEX SCORE FROM A COMBINATION OF THE UPDATED FIRST RANKING AND THE UPDATED SECOND RANKING
714

FIG. 7

TIME AND CLICK BASED UPDATABLE STATIC WEB PAGE RANKING

INTRODUCTION

The subject disclosure relates to search engines, online search, and search queries, and particularly to a time and click based updatable static ranking of web pages in a search index.

A user search query, often referred to simply as a "search query," is an expression that a user enters into a search engine when seeking information, answers, products, or services. A search query is the specific phrase and/or keywords that users use to articulate their information needs and to initiate a search process. For example, a search query can include a textual expression entered into a search bar, a verbal expression spoken to the search engine, and/or a combination of textual and verbal input. Search queries can vary widely in length and complexity, ranging from simple single-word queries like "weather" to more specific and complex queries like "best smartphones under $500 with good camera quality."

When a user provides a search query to a search engine, the search engine's algorithms process the search query and retrieve relevant results that best match the user's search intent. Often, search results include a list of web page links (Uniform Resource Locators or URLs) displayed on a search engine results page (SERP), and the user can browse through and select one or more of the provided links to be directed to an underlying resource (e.g., a webpage) of interest.

Many search engines rely upon a pre-populated URL index, also referred to as a "search index" or "web index," to ensure the retrieval of the most relevant results for a search query. A search index is a large database maintained by (or accessible to) a search engine that contains information about a variety of web pages and their content. The search index serves as a sort of ranked catalog of web pages that have been crawled, analyzed, and indexed by the search engine's web crawlers. The search index contains key information about each indexed page, such as the web page's URL, content (textual data, graphical data, audio data, etc.), metadata, language, location relevance, and other relevant metadata.

When a user enters a search query into a search engine, the search engine can poll (query) the search index to retrieve one or more indexed web page links that match the user's search intent. For example, the search index can be queried to find web pages that contain keyword(s) and context related to the user's query. In some implementations, the search engine will list the retrieved web page links in the SERP by order of their indexed position in the search index. In some implementations, the search engine can return the retrieved web page links in an order which considers the query itself, the relevance of the results, and the respective ranks in the search index.

SUMMARY

Embodiments of the present invention are directed to methods for providing time and click based updatable static web page ranking. A non-limiting example method includes identifying a web page at a discovery time, predicting, by a first ranking model, a first ranking of the web page using first features available at the discovery time, and predicting, by a second ranking model, a second ranking of the web page using the first features. An index score is generated from the first ranking and the second ranking. The method includes, after discovery time, predicting, by the first ranking model, an updated first ranking of the web page using the first features, predicting, by the second ranking model, an updated second ranking of the web page using the first features and second features not available at the discovery time, and updating the index score from a combination of the updated first ranking and the updated second ranking.

Embodiments of the present invention are directed to systems for providing time and click based updatable static web page ranking. A non-limiting example system includes a memory having computer readable instructions and one or more processors for executing the computer readable instructions. The computer readable instructions control the one or more processors to perform various operations. The operations include receiving a first trigger including a discovery of a web page at a discovery time. The operations include, in response to the first trigger, predicting, by a first ranking model, a first ranking of the web page using first features available at the discovery time, predicting, by a second ranking model, a second ranking of the web page using the first features, and generating an index score from a combination of the first ranking and the second ranking. The operations include receiving a second trigger including one of a click event for the web page and a time elapsed for the web page. The operations include, in response to the second trigger, predicting, by the first ranking model after the discovery time, an updated first ranking of the web page using the first features, predicting, by the second ranking model after the discovery time, an updated second ranking of the web page using the first features and second features not available at the discovery time, and updating the index score from a combination of the updated first ranking and the updated second ranking.

Another non-limiting example system includes a memory having computer readable instructions and one or more processors for executing the computer readable instructions. The computer readable instructions control the one or more processors to perform various operations. The operations include training a first ranking model to predict a first ranking of a web page using first features available at a discovery time. In some embodiments, training the first ranking model includes partially masking labeled training data to remove post-discovery data. The operations further include training a second ranking model to predict a second ranking of the web page using the first features and second features not available at the discovery time. In some embodiments, training the second ranking model includes unmasking the labeled training data such that the labeled training data includes the removed post-discovery data.

The above features and advantages, and other features and advantages of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 depicts a block diagram for a time and click based updatable static ranking of a web page in a search index at discovery in accordance with one or more embodiments;

FIG. 7 depicts a flowchart of a method for an updatable static search index in accordance with one or more embodiments.

Figure 2:
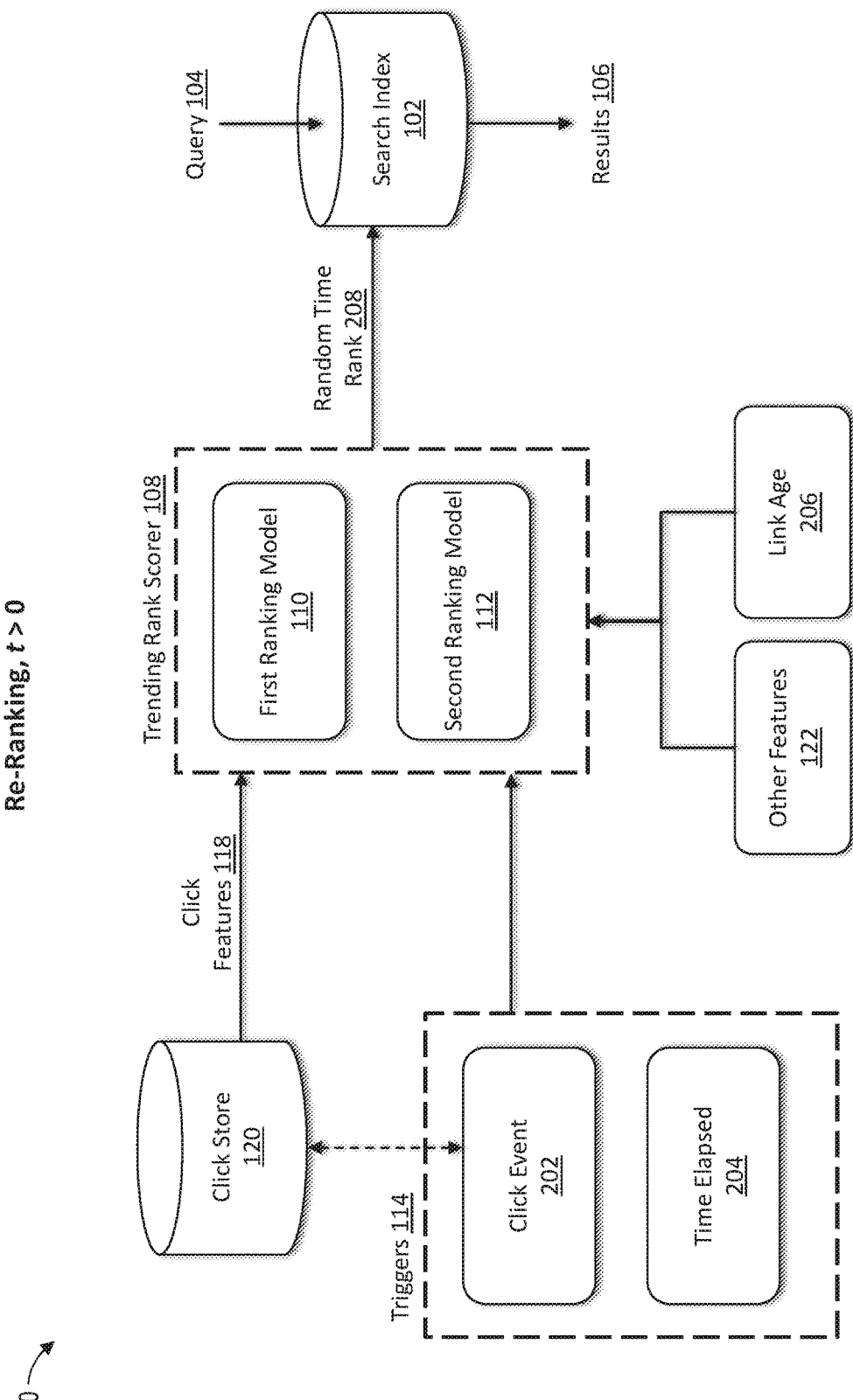
FIG. 2 depicts a block diagram for re-ranking the web page of FIG. 1 post-discovery in accordance with one or more embodiments.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number corresponds to the figure in which its element is first illustrated.

DETAILED DESCRIPTION

The search index is the backbone of a search engine's ability to deliver accurate and relevant search results to users. When a user enters a search query into a search engine, the search engine can poll (query) the search index to retrieve one or more indexed web page links that match the user's search intent. The search engine can then list the retrieved web page links in a search engine results page (SERP). To ensure accurate search results, the search engine's algorithms can be designed to identify one or more relevant web pages in the search index that contain content and metadata (stored in the search index with the respective web page) matching the search query's keyword(s) and/or context.

Search indices are usually populated with a large number of web page links (often millions or even billions of links) using a process known as crawling (or "web crawling"). In an example, crawling involves the systematic exploration of the web (or more formally, the "Internet") by automated programs known as web crawlers, spiders, and/or search engine bots. The primary goal of crawling is to discover web pages, gather their Uniform Resource Locator (URL) and content, and prepare them for indexing in a search index.

Crawling typically, but not necessarily, includes a predetermined list of seed URLs which serve as the starting point for exploration. To build up a search index, a web crawler can access known web pages (via seed URLs or other URLs already in the search index) to find and extract new web page links found on those respective web pages. In other words, a web crawler can extract new links from known web pages and these links serve as a sort of pathway through the Internet that leads to yet other web pages (and their links). A web crawler can follow a chain of links to "new" pages (from the perspective of the web crawler), and this process can continue recursively as more web pages and their associated URLs are discovered.

Once a web page is discovered, a process often referred to as "URL discovery", the web page must be evaluated for indexing in the search index. In ranked search indices, the indexed position of each respective web page link within the search index serves as a sort of rank of that respective link relative to the other links in the search index. In short, a link having a relatively higher position in the search index (although a "higher" position might be quantified as an index position closer to a first, or zeroth, position in the index) is deemed to be of higher quality than a link having a relatively lower position. In many search engines, the web page links retrieved from the search index and provided in the SERP are listed in order of their indexed position in the search index. For example, a search for "weather" might result in hundreds of web page links having contextual/keyword matches in a search index, and a search engine might select only the first 10 (or 20, 100, etc.) of those web page links for the SERP.

Accordingly, a web page's position in a search index can be critical to determining whether a respective web page will be offered by a search engine as a suggestion in response to a user's search query (and, if offered, at what position). Unfortunately, typical search indices operate in a somewhat static manner, where a web page and its respective web page link are only indexed with the search index at the time of discovery. In an example, "discovery" means the identification of a web page (or a web page link to a web page) via a web crawler or otherwise that has yet to be indexed or evaluated for placement within a respective search index. As an example, the discovery of a web page is the identification of a web page that was previously unknown to the search index.

So-called static ranking/indexing systems try to predict, at the time of discovery, the appropriate rank for a web page. This rank should represent, as accurately as possible, how well the web page will perform relative to other web pages in the index. For limited indices (for example, those having a fixed or capped number of total available positions), a decision must also be made as to whether the web page should be included at all. Web page link performance can be measured via a variety of metrics, but in essence, qualifies the relative (to other web pages) likelihood of a web page being visited when offered as a suggestion in an SERP. Web pages that are more likely to be visited should have a higher rank in the search index, and vice versa.

This disclosure introduces a time and click based updatable static ranking of web pages in a search index. Rather than assigning a static, one-time index rank (position) to a web page at discovery, aspects of the present disclosure allow for a static ranking of web pages to be updated continuously, periodically, and/or via triggering events. Updating a static ranking of web pages can include ranking, re-ranking, adding, and removing web pages to and from a search index over time. In other words, web pages are evaluated and re-evaluated over time to build a robust, evolving search index.

In some embodiments, a web page is given an initial rank (or is not ranked) at the time of discovery using a trained ranking model (referred to herein as the trending rank scorer) based on the limited initial information available at discovery. The information available at discovery can include, for example, a number of other web pages linking to the respective web page, a host identifier, etc. Later, as new information becomes available the trending rank scorer can reevaluate the web page. This new information can include, for example, a number of interactions (e.g., clicks and/or visits) of the web page over time, the current number of other web pages linking to the respective web page, etc.

Updating the static ranking of web pages as described herein solves a number of somewhat related technical issues with current indexing systems. In particular, previously indexed web pages can be revisited and their relative position in the search index can be changed post-discovery (or removed entirely). Similarly, prior web pages that were not deemed valuable enough for indexing at the time of discovery can be reevaluated and added to the search index later. In other words, a time and click based updatable static ranking of web pages allows for a search index to adaptively account for changes to one or more features of a previously discovered web page. In an example, a "feature" of a web page means the technical attributes, elements, and characteristics of a web page that can be considered when evaluating the web page for placement within a respective search index. A feature of a web page can include, for example, the textual content of the web page, non-textual content, such as image and video data, web page metadata, such as the host identifier for the web page, its domain, the structure and format of the respective URL, etc., parent link metadata, such as the parent's host identifier, popularity, rank in the respective search index, page authority as evidenced by number and quality of incoming links, etc., the presence and quality of internal links (links within the same website) and external links (links to other websites), usability metrics, such as page load speed, mobile compatibility, and the availability of accessibility features, security metrics, such as the use of HTTPS encryption, user engagement metrics, such as a click-through rate (CTR), bounce rate, and time spent on the web page, the frequency of content updates, and the time since the last update. Advantageously, a time and click based updatable static ranking of web pages allows for a web page to be "scored" or re-ranked as many times as desired and according to any of a number of predetermined conditions and/or scheduling regimes. Other advantages are possible.

Notably, the quality of a web page at the time of discovery—and it's original position (or lack thereof) in a search index—can, over time, become a poor proxy for the current quality of the web page. Consider, for example, a web page that is discovered shortly after being built. The content is limited and the web page has few links and even fewer (perhaps only one) web page(s) linking to it. At discovery, the trending rank scorer assigns a relatively low score to this web page and it is not added to the search index. Long after discovery, the web page adds a large amount of content and becomes extremely popular. Various metrics, such as a number of visits to the web page and the number of other web pages linking to the web page, have increased dramatically. Unlike a static search index, the trending rank scorer described herein can re-score the web page and, due to changes in various factors, assign the web page to a position in the search index. In another example, consider a once-popular web page that is no longer maintained. The once relatively high number of clicks to the web page have, over time, drifted towards zero. A search engine using a static search index will continue to recommend the web page in response to user queries long after the web page is relevant. Conversely, a search engine using an updatable static search index built in accordance with one or more embodiments can, over time, down-rank the web page to account for the drop in click metrics (eventually even dropping the web page from the search index entirely). In yet another example, consider a web page having content that begins trending. A trending web page might include, for example, viral social media posts, breaking news, sports outcomes, etc. The current position in the search index for such a web page may not accurately reflect current usage. An updatable static search index can, responsive to metrics indicating that the web page is trending, up-rank the web page. Such metrics can include, for example, a number of recent clicks (e.g., clicks over past 2 hours, 12 hours, 24 hours, etc.) exceeding historical norms (e.g., estimated clicks according to current index position) by a predetermined threshold. In short, while the ranking of web pages in a search index impacts the quality of the results offered by a search engine, those rankings, in a static search index, are heavily influenced by the somewhat random property of the discovery time of the respective web pages. An updatable static search index, conversely, can update ranks to web pages in a manner that is agnostic to discovery time and natively more responsive than static architectures which are not updatable.

FIG. 1 depicts a block diagram 100 for a time and click based updatable static ranking of a web page in a search index at discovery in accordance with one or more embodiments of the present invention. FIG. 2 depicts a block diagram 200 for re-ranking the web page of FIG. 1 post-discovery in accordance with one or more embodiments of the present invention.

As shown in FIGS. 1 and 2, a search index 102 receives a user search query (here, "query 104") and, in response, provides results 106. In some embodiments, the query 104 can be forwarded to the search index 102 by an upstream system, such as a search engine (not separately shown), into which a user has provided the query (e.g., via a user interface into a search bar of the search engine). In some embodiments, the query 104 is received directly by the search index 102.

In some embodiments, the search index 102 can be queried (either by a user directly or via a search engine) to find web pages that contain keyword(s) and/or context related to the query 104. In some embodiments, the search index 102 includes an ordered list (index, ranking) of a plurality of web pages (refer to FIGS. 3-5 for example rankings). In some embodiments, the results 106 returned by the search index 102 include a list of web pages sorted in order of their relative ranking (for example, their indexed position) within the search index 102.

In some embodiments, a trending rank scorer 108 assigns ranks to the web pages to determine their position, if any, in the search index 102. In some embodiments, the trending rank scorer 108 includes a first ranking model 110 (also referred to as a discovery time ranker) and a second ranking model 112 (also referred to as a random time ranker). In some embodiments, the trending rank scorer 108 is configured to assign (or re-assign) a rank to a web page in response to a trigger(s) 114.

With respect to FIG. 1 specifically, the initial trigger 114 at discovery (e.g., at t=0) is the discovery itself of the web page (here, "discovery 116"). In some embodiments, the trending scorer 108 retrieves, responsive to the discovery 116, one or more click features 118 from a click store 120 as well as one or more other features 122. The various features (e.g., click features 118, other features 122, etc.) are discussed in greater detail below (refer to "Training").

The click store 120 can include an external or internal database configured to store the click features 118. In some embodiments, the click store 120 tracks impressions (e.g., clicks, visits, etc.) of a plurality of web pages. In some embodiments, the click store 120 tracks the number of clicks of a web page link of a respective web page. In some embodiments, the click store 120 tracks the clicks as a time series of clicks over predetermined intervals (buckets) of time. For example, the click store 120 can track the number of clicks of a web page over the last 1 hour, 2 hours, 4 hours, 12 hours, 24 hours, a week, a month, a quarter, a year, etc. In some embodiments, the click store 120 tracks clicks for one or more web pages indexed within the search index 102. In some embodiments, the click store 120 tracks impressions for one or more web pages that, at discovery, were not given high enough scores for indexing within the search index 102. As will be discussed later, tracking clicks for currently unranked web pages allows those features to be relied upon when re-evaluating the respective web page. Advantageously, re-ranking can result in a previously discovered but non-indexed web page to be indexed within the search index 102.

In some embodiments, the trending rank scorer 108 is trained to output, responsive to the click features 118 and the other features 122, a discovery time rank 124 (also referred to as a first ranking). In some embodiments, the discovery time rank 124 is a score and/or position for the web page within the search index 102. Training the trending rank scorer 108 to output the discovery time rank 124 is discussed in greater detail below (refer to "Training").

With respect now to FIG. 2, the triggers 114 after the point of discovery (e.g., at t>0) include predetermined user interactions, such as a user clicking a link to the web page (here, a "click event 202") as well as the "staleness" of the evaluation of the respective web page (here, the "time elapsed 204"). In some embodiments, the time elapsed 204 is a predetermined interval after which a given web page is marked for re-evaluation in the search index 102. For example, the time elapsed 204 can trigger a re-evaluation after 1 hour, 2 hours, 4 hours, 12 hours, 24 hours, 3 days, a week, a month, a quarter, a year, etc.

In some embodiments, the trending scorer 108 retrieves, responsive to the click event 202 or time elapsed 204, one or more click features 118 from the click store 120, the one or more other features 122, and a link age 206 (also referred to as URL age). The link age 206, in contrast to the time elapsed 204, refers specifically to the time since discovery for the respective web page. In particular, the link age 206 will be zero at discovery, and will increase indefinitely as time passes (the time elapsed 204 will reset after re-evaluating). In some embodiments, the trending rank scorer 108 is trained to output, responsive to the click features 118, the other features 122, and the link age 206, a random time rank 208 (also referred to as a second ranking). As used herein, a "random" time rank 208 refers to the fact that the time at which the triggers 114 occur is not known a priori. In some embodiments, the rank time rank 208 is a score and/or position for the web page within the search index 102, in a similar manner as for the discovery time rank 124 discussed with respect to FIG. 1.

In some embodiments, the discovery time rank 124 is compared via the trending rank scorer 108, the search index 102, and/or a search engine against the random time rank 208. In some embodiments, the random time rank 208 is provided to the search index 102 only when the change (delta) in relative ranking for the respective web page within the search index 102 is greater than a predetermined threshold. In other words, an update in the ranking of a respective web page must result in a position change within the search index 102 having a magnitude that is greater than some predetermined threshold. In this manner, constant trivial (for example, low magnitude) adjustments to the search index 102 can be mitigated and/or avoided. For example, in some embodiments, the random time rank 208 is provided to the search index 102 only when the new rank indicates a 10, 20, 100, etc. (or 1 percent, 5 percent, 20 percent, 40 percent, etc.) up-ranking or down-ranking of the respective web page within the search index 102. The predetermined threshold can be adjusted as desired to tune the re-ranking aggressiveness of the trending rank scorer 108.

Training

In some embodiments, the first ranking model 110 and the second ranking model 112 are trained to assign a rank (score) to a web page based on a plurality of input features. In some embodiments, the first ranking model 110 and the second ranking model 112 are trained using a labeled dataset (not separately shown) of training data (e.g., web pages having known or target rankings). While the exact configurations (e.g., transformer, recurrent neural network, etc.) and complexity (e.g., number of layers, nodes, etc.) of the first ranking model 110 and the second ranking model 112 are not meant to be particularly limited, in some embodiments, the first ranking model 110 and the second ranking model 112 each include a number of nodes having respective weights, and "training" as used herein means adjusting those weights until an output (e.g., the discovery time rank 124 and/or the random time rank 208) for input web pages matches the known or target rankings in the labeled dataset. In short, weights can be adjusted until the first ranking model 110 and the second ranking model 112 provide reasonable (within any level of accuracy, subject only to training time and depth) determinations of web page rankings.

In some embodiments, the first ranking model 110 is trained to rank web pages using only those features available at discovery 116, while the second ranking model 112 is trained to rank web pages using all available data (for example, those features available both at and post-discovery). In other words, in some embodiments, the training data can be partially masked to remove post-discovery data from the labeled dataset for training the first ranking model 110. The technical effect of building the first ranking model 110 from partially masked training data and building the second ranking model 112 from unmasked training data is the creation of two rankers that, even if built from the same underlying architecture, will have different internal weights (that is, the weights for the first ranking model 110 and the second ranking model 112 will be different). In this manner, the first ranking model 110 natively focuses on features available at discovery, while the second ranking model 112 considers all features. The practical effect of building the two rankers in this manner is that the first ranking model 110 and the second ranking model 112 will provide a different output (web page rank), even for the same input web page. Moreover, the ranks will be different for the same web page even when determined at the same time (e.g., at discovery).

The features used in training are not meant to be particularly limited, but can be generally split into discovery features and post-discovery features. Discovery features include any of the features related to a web page that are known (or knowable) at discovery. Discovery features can include, for example, web page metadata (e.g., the host identifier for the web page, domain, etc.) and parent link metadata (e.g., the parent's host identifier, popularity, rank in the search index 102, page authority as evidenced by number and quality of incoming links, etc.). Notably, in some embodiments, the discovery time itself can be included in the discovery features, which, when leveraged with labeled training data having known discovery times (and therefore time since discovery), can allow the first ranking model 110 and the second ranking model 112 to learn to discount (via a lower or even negative weight, etc.) discovery data as that data becomes stale.

Post-discovery features, in contrast, include those features related to a web page which are not known (or knowable) at discovery. Post-discovery features can include, for example, a time series of click data (e.g., how often the web page is clicked over a given time frame), usefulness heuristics (e.g., how often the web page is clicked when provided in results 106), popularity heuristics (e.g., the observed or reported traffic to the web page, whether the web page is trending, as measured, for example, by a relatively large increase in clicks over a relative short period of time), page authority (the number of other web pages known to link to the respective web page, the quality of those web pages), click metadata (e.g., local client time when clicked, client location when clicked), etc.

Referring again to FIGS. 1 and 2, the click features 118 can include both discovery features (e.g., how often is the parent link of a respective link clicked) and post-discovery features (e.g., how often is the respective link itself clicked). The other features 122 also includes both discovery (web page and parent link metadata, the discovery time itself, etc.) and post-discovery features (the time series of click data for the respective web page, the usefulness and popularity heuristics, click metadata, etc.).

Static Indexing with Updates—Examples

Figure 3:
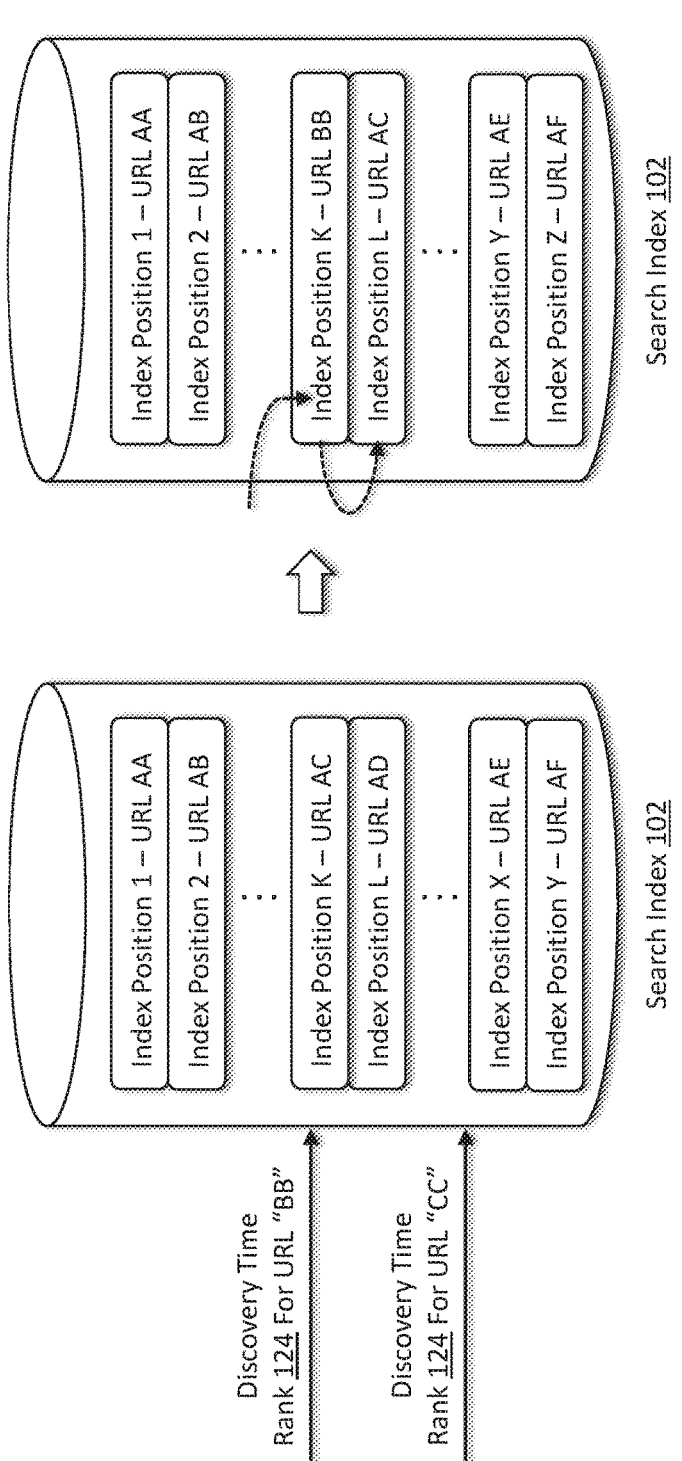
FIG. 3 depicts a block diagram for an example initial indexing of a web page in a search index at discovery in accordance with one or more embodiments.

FIG. 3 depicts a block diagram 300 for an example initial indexing of a web page in a search index at discovery in accordance with one or more embodiments of the present invention. As shown in FIG. 3, the search index 102 includes a plurality of web page links (here, "URLs") assigned to one of a plurality of index positions (here, "Index Position 1" to "Index Position Y"). For example, the search index 102 can include the web page links AA, AB, AC, AD, AE, and AF assigned to the positions 1, 2, K, L, X, and Y, respectively.

As further shown in FIG. 3, a discovery time rank 124 has been provided for newly discovered web page links "BB" and "CC". As discussed previously, the search index 102 can be updated according to the discovery time rank 124.

In some embodiments, the discovery time rank 124 for the web page link BB is sufficient for placement within the search index 102. For example, the discovery time rank 124 for BB can indicate a score qualifying BB for Index Position K. In response, the search index 102 inserts the web page link BB into Index Position K, causing the web page link AC (formally at index position K) to drop to Index Position L. Similarly, all other web page links below Index Position K will drop to accommodate the web page link BB. In some embodiments, the search index 102 is un-capped (or the cap has yet to be reached), and the result is an increase in the size of the search index 102 (as shown). For example, the search index 102 can now include an Index Position Z. In other embodiments, the search index 102 is capped and at capacity, and adding the web page link BB will result removal of a lowest ranked web page link (e.g., web page link "AF").

In some embodiments, the discovery time rank 124 for the web page link CC is not sufficient for placement within the search index 102. For example, the discovery time rank 124 for CC can indicate a score below the currently lowest ranked web page link (here, "AF") in a scenario where the Search Index 102 is capped and at capacity. In response, the search index 102 does not insert the web page link CC. However, in some embodiments, the newly discovered web page link CC can be marked for tracking by the trending rank scorer 108 within the click store 120. In this manner, the web page link CC might be added to the search index 102 at a later time, when information has changed (refer to FIG. 5).

Figure 4:
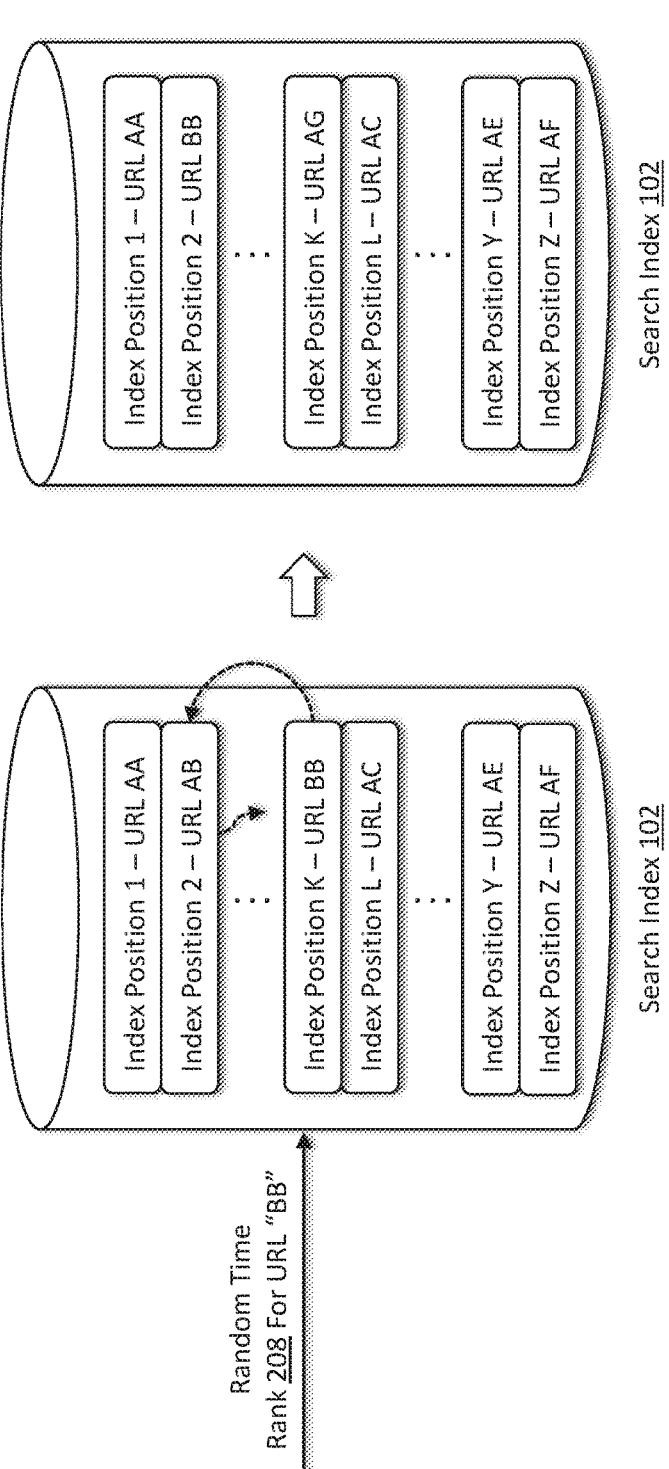
FIG. 4 depicts a block diagram for an example re-indexing of a web page in a search index post-discovery in accordance with one or more embodiments.

FIG. 4 depicts a block diagram 400 for an example re-indexing of a web page in a search index post-discovery in accordance with one or more embodiments of the present invention. As shown in FIG. 4, a random time rank 208 has been provided for the previously discovered (refer to FIG. 3) web page link "BB".

In some embodiments, the random time rank 208 for the web page link BB is sufficient for up-ranking within the search index 102. For example, the random time rank 208 for BB can indicate a score qualifying BB for Index Position 2. In response, the search index 102 moves the web page link BB from Index Position K to Index Position 2, causing the web page link AB (formally at index position 2) to drop to Index Position 3 (not shown). Similarly, all other web page links between Index Position 2 and Index Position K will drop to accommodate the web page link BB.

Figure 5:
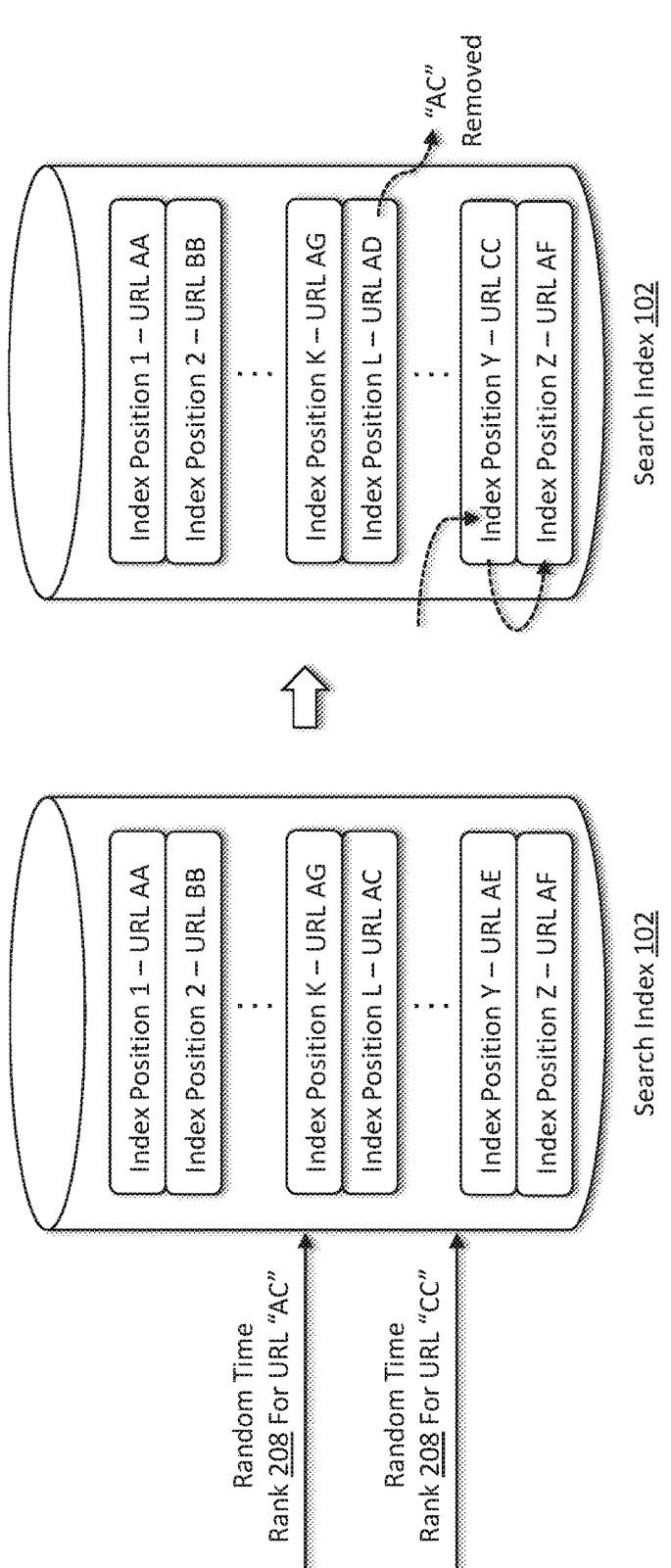
FIG. 5 depicts a block diagram for an example of adding to and removing from a search index post-discovery in accordance with one or more embodiments.

FIG. 5 depicts a block diagram 500 for an example of adding to and removing from a search index post-discovery in accordance with one or more embodiments of the present invention. As shown in FIG. 5, a random time rank 208 has been provided for the previously discovered (refer to FIG. 3) web page links "AC" and "CC".

In some embodiments, the random time rank 208 for the web page link AC is no longer sufficient for placement within the search index 102. For example, the random time rank 208 for AC can indicate a score below the currently lowest ranked web page link (here, "AF") in a scenario where the Search Index 102 is capped and at capacity. In response, the search index 102 removes the web page link AC, causing the web page link AD to return to Index Position L and all other web page links after Index Position L to advance by one (this intermediate configuration of the search index 102 is omitted for clarity).

As described previously, the web page link CC was not placed within the search index 102 at discovery. In some embodiments, the random time rank 208 for the web page link CC is now sufficient for inclusion within the search index 102. For example, the random time rank 208 for CC can indicate a score qualifying CC for Index Position Y. In response, the search index 102 inserts the web page link CC into Index Position Y, causing the web page link AF (formally at index position Y due to the removal of AC) to drop to Index Position Z.

Figure 6:
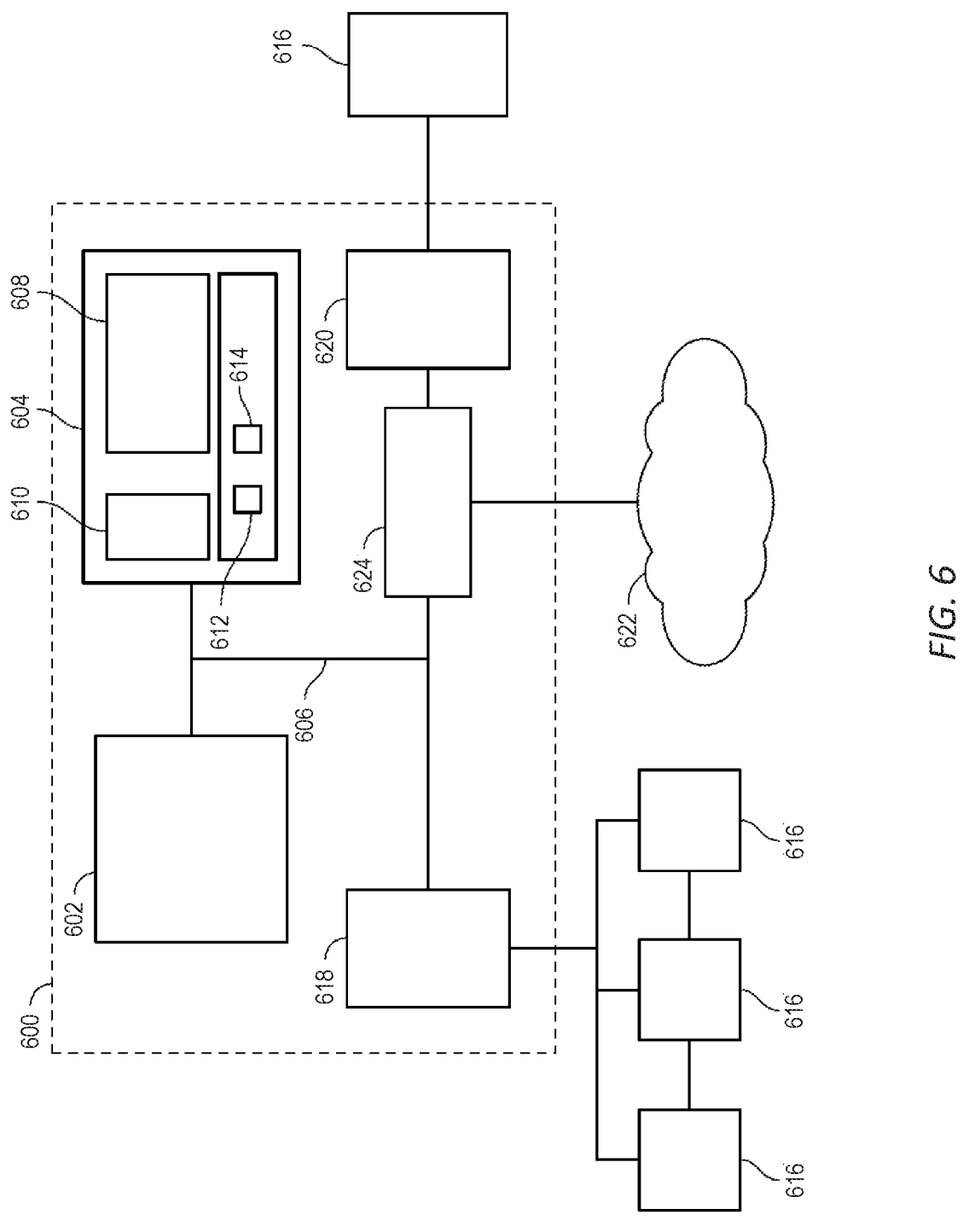
FIG. 6 depicts a block diagram of a computer system according to one or more embodiments.

FIG. 6 illustrates aspects of an embodiment of a computer system 600 that can perform various aspects of embodiments described herein. In some embodiments, the computer system(s) 600 can implement and/or otherwise be incorporated within or in combination with the trending rank scorer 108 and/or the search index 102 described with respect to FIGS. 1 and 2. In some embodiments, a computer system 600 can be implemented server-side. For example, a computer system 600 can be configured to determine a discovery time rank 124 and/or a random time rank 208 as described previously herein.

The computer system 600 includes at least one processing device 602, which generally includes one or more processors or processing units for performing a variety of functions, such as, for example, completing any portion of the block diagrams 100, 200, 300, 400, and 500 described previously herein. Components of the computer system 600 also include a system memory 604, and a bus 606 that couples various system components including the system memory 604 to the processing device 602. The system memory 604 may include a variety of computer system readable media. Such media can be any available media that is accessible by the processing device 602, and includes both volatile and non-volatile media, and removable and non-removable media. For example, the system memory 604 includes a non-volatile memory 608 such as a hard drive, and may also include a volatile memory 610, such as random access memory (RAM) and/or cache memory. The computer system 600 can further include other removable/non-removable, volatile/non-volatile computer system storage media.

The system memory 604 can include at least one program product having a set (e.g., at least one) of program modules that are configured to carry out functions of the embodiments described herein. For example, the system memory 604 stores various program modules that generally carry out the functions and/or methodologies of embodiments described herein. A module or modules 612, 614 may be included to perform functions related to the block diagrams 100, 200, 300, 400, and 500 as described previously herein. The computer system 600 is not so limited, as other modules may be included depending on the desired functionality of the computer system 600. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 602 can also be configured to communicate with one or more external devices 616 such as, for example, a keyboard, a pointing device, and/or any devices (e.g., a network card, a modem, etc.) that enable the processing device 602 to communicate with one or more other computing devices. Communication with various devices can occur via Input/Output (I/O) interfaces 618 and 620.

The processing device 602 may also communicate with one or more networks 622 such as a local area network (LAN), a general wide area network (WAN), a bus network and/or a public network (e.g., the Internet) via a network adapter 624. In some embodiments, the network adapter 624 is or includes an optical network adaptor for communication over an optical network. It should be understood that although not shown, other hardware and/or software components may be used in conjunction with the computer system 600. Examples include, but are not limited to, microcode, device drivers, redundant processing units, external disk drive arrays, RAID systems, and data archival storage systems, etc.

Referring now to FIG. 7, a flowchart 700 for providing an updatable static search index is generally shown according to an embodiment. The flowchart 700 is described with reference to FIGS. 1 to 6 and may include additional steps not depicted in FIG. 7. Although depicted in a particular order, the blocks depicted in FIG. 7 can be, in some embodiments, rearranged, subdivided, and/or combined.

At block 702, the method includes identifying a web page at a discovery time.

At block 704, the method includes predicting, by a first ranking model, a first ranking of the web page using first features available at the discovery time. In some embodiments, the first features include one or more of web page metadata including a host identifier for the web page and a domain for the web page, parent link metadata including a host identifier for a parent web page, a search index rank of the parent web page, and a page authority of the parent web page, and the discovery time.

At block 706, the method includes predicting, by a second ranking model, a second ranking of the web page using the first features.

At block 708, the method includes generating an index score from a combination of the first ranking and the second ranking.

At block 710, the method includes predicting, by the first ranking model after the discovery time, an updated first ranking of the web page using the first features. Observe that, post-discovery, the qualia and/or values of the first features (or second features, etc.) themselves can change. For example, the quality of a web page (or a host of the web page, etc.) can change after discovery.

At block 712, the method includes predicting, by the second ranking model after the discovery time, an updated second ranking of the web page using the first features and second features not available at the discovery time. In some embodiments, the second features include one or more of a time series of click data, usefulness heuristics including how often the web page is clicked when provided in search results, popularity heuristics including an observed or reported traffic to the web page and a trending measure, a page authority including a number of other web pages known to link to the respective web page and a quality of the other web pages, and click metadata including a local client time when clicked and a client location when clicked.

At block 714, the method includes updating the index score from a combination of the updated first ranking and the updated second ranking.

In some embodiments, the method further includes placing, at the discovery time, the web page within a search index at a position defined by the index score. In some embodiments, the method further include adjusting, after the discovery time, the position of the web page within the search index based in part on the updated index score.

In some embodiments, the method further includes determining, at the discovery time and from the index score, that the web page does not qualify to be placed within a search index. In some embodiments, the method further includes placing, after the discovery time and from the updated index score, the web page within the search index at a position defined by the updated index score.

In some embodiments, the method further includes placing, at the discovery time, the web page within a search index at a position defined by the index score. In some embodiments, the method further includes removing, after the discovery time and based at least in part on the updated index score, the web page from the search index.

In some embodiments, the method further includes training the first ranking model and the second ranking model using labeled training data including a plurality of web pages having target rankings in a search index. In some embodiments, training the first ranking model includes partially masking the labeled training data to remove post-discovery data. In some embodiments, training the second ranking model includes unmasking the labeled training data such that the labeled training data includes the removed post-discovery data.

In some embodiments, weights of the first ranking model differ from weights of the second ranking model.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the invention are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", "passing to", etc. describe a communication path between two elements and does not imply a direct connection between the elements with no intervening elements/connections therebetween unless specified. A respective communication path can be a direct or indirect communication path.

The corresponding structures, materials, acts, and equivalents of all means or step plus function elements in the claims below are intended to include any structure, material, or act for performing the function in combination with other claimed elements as specifically claimed.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:
1. A method comprising:
identifying a web page at a discovery time, wherein, at the discovery time, the web page is not included in a search index;

ranking, at discovery time, the web page, wherein ranking the web page comprises:

predicting, by a first ranking model, a first ranking of the web page using first features available at the discovery time, the first ranking model having a first set of weights learned by training on a training set in a masked state, the training set comprising discovery features and post-discovery features, the training set masked to include only the discovery features;

predicting, by a second ranking model, a second ranking of the web page using the first features, the second ranking model having a second set of weights learned by training on the training set in an unmasked state including the discovery features and the post-discovery features;

generating an index score from a combination of the first ranking and the second ranking; and placing, at the discovery time, the web page within the search index at a position defined by the index score; and re-ranking, after the discovery time, the web page, wherein re-ranking the web page comprises:

predicting, by the first ranking model after the discovery time, an updated first ranking of the web page using only the first features;

predicting, by the second ranking model after the discovery time, an updated second ranking of the web page using the first features and second features not available at the discovery time;

updating the index score from a combination of the updated first ranking and the updated second ranking; and adjusting, after the discovery time, the position of the web page within the search index based in part on the updated index score.

2. The method of claim 1, further comprising:

determining, at the discovery time and from the index score, that the web page does not qualify to be placed within a search index; and placing, after the discovery time and from the updated index score, the web page within the search index at a position defined by the updated index score.

3. The method of claim 1, further comprising:

placing, at the discovery time, the web page within a search index at a position defined by the index score; and removing, after the discovery time and based at least in part on the updated index score, the web page from the search index.

4. The method of claim 1, wherein the first features comprise one or more of web page metadata including a host identifier for the web page and a domain for the web page, parent link metadata including a host identifier for a parent web page, a search index rank of the parent web page, and a page authority of the parent web page, and the discovery time.

5. The method of claim 1, wherein the second features comprise one or more of a time series of click data, usefulness heuristics including how often the web page is clicked when provided in search results, popularity heuristics including an observed or reported traffic to the web page and a trending measure, a page authority including a number of other web pages known to link to the respective web page and a quality of the other web pages, and click metadata including a local client time when clicked and a client location when clicked.

6. The method of claim 1, further comprising training the first ranking model and the second ranking model using labeled training data comprising a plurality of web pages having target rankings in a search index.

7. The method of claim 6, wherein training the first ranking model comprises partially masking the labeled training data to remove post-discovery data.

8. The method of claim 7, wherein weights of the first ranking model differ from weights of the second ranking model.

9. A system having a memory comprising a non-transitory computer readable media, computer readable instructions, and one or more processors for executing the computer readable instructions, the computer readable instructions controlling the one or more processors to perform operations comprising:

receiving a first trigger comprising a discovery of a web page at a discovery time, wherein, at the discovery time, the web page is not included in a search index;

in response to the first trigger, ranking, at discovery time, the web page, wherein ranking the web page comprises:

predicting, by a first ranking model, a first ranking of the web page using first features available at the discovery time, the first ranking model having a first set of weights learned by training on a training set in a masked state, the training set comprising discovery features and post-discovery features, the training set masked to include only the discovery features;

predicting, by a second ranking model, a second ranking of the web page using the first features, the second ranking model having a second set of weights learned by training on the training set in an unmasked state including the discovery features and the post-discovery features;

generating an index score from a combination of the first ranking and the second ranking; and placing, at the discovery time, the web page within the search index at a position defined by the index score; and receiving a second trigger comprising one of a click event for the web page and a time elapsed for the web page;

in response to the second trigger, re-ranking, after the discovery time, the web page, wherein re-ranking the web page comprises:

predicting, by the first ranking model after the discovery time, an updated first ranking of the web page using only the first features;

predicting, by the second ranking model after the discovery time, an updated second ranking of the web page using the first features and second features not available at the discovery time;

updating the index score from a combination of the updated first ranking and the updated second ranking; and adjusting, after the discovery time, the position of the web page within the search index based in part on the updated index score.

10. The system of claim 9, wherein the click event comprises detecting a click, by a user, of a link to the web page.

11. The system of claim 9, wherein the time elapsed for the web page comprises a predetermined interval after which the respective web page is re-evaluated.

12. The system of claim 11, wherein receiving the second trigger comprises determining that the time elapsed exceeds the predetermined interval.

13. The system of claim 12, wherein the time elapsed for the web page is reset after updating the index score.

14. The system of claim 9, wherein the first features comprise one or more of web page metadata including a host identifier for the web page and a domain for the web page, parent link metadata including a host identifier for a parent web page, a search index rank of the parent web page, and a page authority of the parent web page, and the discovery time; and wherein the second features comprise one or more of a time series of click data, usefulness heuristics including how often the web page is clicked when provided in search results, popularity heuristics including an observed or reported traffic to the web page and a trending measure, a page authority including a number of other web pages known to link to the respective web page and a quality of the other web pages, and click metadata including a local client time when clicked and a client location when clicked.

15. A system having a memory comprising a non-transitory computer readable media, computer readable instructions, and one or more processors for executing the computer readable instructions, the computer readable instructions controlling the one or more processors to perform operations comprising:

training a first ranking model to predict a first ranking of a web page using first features available at a discovery time, the first ranking model having a first set of weights learned by training on a training set in a masked state, the training set comprising discovery features and post-discovery features, the training set masked to include only the discovery features;

training a second ranking model to predict a second ranking of the web page, the second ranking model having a second set of weights learned by training on the training set in an unmasked state including the discovery features and the post-discovery features;

ranking, at discovery time, the web page, wherein, at the discovery time, the web page is not included in a search index, and wherein ranking the web page comprises:

predicting, by the first ranking model, a first ranking of the web page using first features available at the discovery time;

predicting, by the second ranking model, a second ranking of the web page using the first features;

generating an index score from a combination of the first ranking and the second ranking; and placing, at the discovery time, the web page within the search index at a position defined by the index score; and re-ranking, after the discovery time, the web page, wherein re-ranking the web page comprises:

predicting, by the first ranking model after the discovery time, an updated first ranking of the web page using only the first features;

predicting, by the second ranking model after the discovery time, an updated second ranking of the web page using the first features and second features not available at the discovery time;

updating the index score from a combination of the updated first ranking and the updated second ranking; and adjusting, after the discovery time, the position of the web page within the search index based in part on the updated index score.

16. The system of claim 15, wherein weights of the first ranking model differ from weights of the second ranking model.

17. The system of claim 15, wherein the computer readable instructions further control the one or more processors to, in response to receiving a first trigger comprising a discovery of the web page at the discovery time:

predict, using the first ranking model, the first ranking of the web page using the first features;

predict, using the second ranking model, the second ranking of the web page using the first features; and generate an index score from a combination of the first ranking and the second ranking.

18. The system of claim 17, wherein the computer readable instructions further control the one or more processors to, in response to receiving a second trigger comprising one of a click event for the web page and a time elapsed for the web page:

predict, using the first ranking model after the discovery time, an updated first ranking of the web page using the first features;

predict, using the second ranking model after the discovery time, an updated second ranking of the web page using the first features and the second features; and update the index score from a combination of the updated first ranking and the updated second ranking.

19. The system of claim 18, wherein the computer readable instructions further control the one or more processors to:

placing, at the discovery time, the web page within a search index at a position defined by the index score; and adjust, after the discovery time, the position of the web page within the search index based in part on the updated index score.

\* \* \* \* \*